Oct. 17, 1972     G. P. ROSE-MILLER     3,698,952

METHOD FOR HANDLING FEEDING DEVICES FOR YOUNG ANIMALS

Filed Dec. 24, 1970     3 Sheets-Sheet 1

INVENTOR
GEORGE P. ROSE-MILLER

Larson, Taylor and Hinds
ATTORNEYS

Oct. 17, 1972     G. P. ROSE-MILLER     3,698,952
METHOD FOR HANDLING FEEDING DEVICES FOR YOUNG ANIMALS
Filed Dec. 24, 1970     3 Sheets-Sheet 2

INVENTOR
GEORGE P. ROSE-MILLER

*Larson, Taylor and Hinds*
ATTORNEYS

Oct. 17, 1972     G. P. ROSE-MILLER     3,698,952
METHOD FOR HANDLING FEEDING DEVICES FOR YOUNG ANIMALS
Filed Dec. 24, 1970     3 Sheets-Sheet 3

INVENTOR
GEORGE P. ROSE-MILLER

*Larson, Taylor and Hinds*
ATTORNEYS

United States Patent Office

3,698,952
Patented Oct. 17, 1972

3,698,952
METHOD FOR HANDLING FEEDING DEVICES FOR YOUNG ANIMALS
Brigadier George Patrick Rose-Miller, "Barevan," Cawdor, Scotland
Filed Dec. 24, 1970, Ser. No. 101,304
Claims priority, application Great Britain, Sept. 17, 1970, 44,458/70
Int. Cl. B08b 9/00
U.S. Cl. 134—22 R  3 Claims

ABSTRACT OF THE DISCLOSURE

A method for handling feeding devices of the type having an elongated nozzle open at its upper end and connected to a liquid feed vessel, a nipple attached to the lower end of the nozzle for delivering liquid feed to an infant animal which nurses in a standing position, and a valve device in the nozzle for controlling the downward flow of liquid. A mounting plate with at least one hollow threaded boss is used (a) to hold the nozzle securely while attaching the nipple onto the nozzle, and (b) to hold the feed device inverted while cleaning the device by dropping it downwardly through a cleaning solution such that the liquid flows through the feeding device.

BACKGROUND OF THE INVENTION

This invention relates to a feed device of the type used for feeding infant animals which nurse in a standing position; and in particular, it relates to a method for handling such a feeding device, especially for assembling and cleaning such feeding devices.

For one reason or another, it is often necessary to separate a newborn animal from its mother. If the animal is to eat well and thrive, it is necessary to simulate as such as possible the natural feeding conditions which the young animal would have experienced with its mother. In the case of an animal such as a calf or the like which nurses in a standing position, it is necessary to simulate natural conditions of feeding from a mother.

A feeding device which serves this purpose has an elongated stiff upper nozzle part connected to the bottom of a feeding vessel, a nipple connected to the bottom of the stiff nozzle part and extending downwardly therefrom, and a valve for controlling the downward flow of liquid from the feed vessel and through the nozzle and nipple. However, the animals feeding from these devices normally subject these devices to relatively strong forces. For example, a calf would not only pinch the nipple but would push up on the nipple thereby tending to push the entire feeding device upwardly and most importantly, it pulls down on the nipple with a relatively strong force. The nipple must be resilient to some extent to stand the pinching and pushing forces. However, at the same time the nipple must be relatively stiff and quite strong in order to withstand the rather intense pulling forces. Not only must the nipple be sufficiently strong so that it does not tear when subjected to such strong pulling forces, but also it must be sufficiently strong so that its grip on the nozzle portion does not become loose as the young animal pulls downwardly.

A nipple which fulfills all of these force characteristics will tend to be somewhat stiff. That is, although it will be possible to squeeze the nipple, the nipple will have relatively slight stretching characteristics. A result of this is that it is quite difficult to assemble a nipple onto its respective nozzle. However, heretofore, the task of assembling a nipple onto its respective nozzle could not be avoided. Not only was this necessary to replace torn or broken nipples on otherwise good nozzles, but also it was necessary to disassemble the nipples from the nozzles just for cleaning purposes.

Thus, there exists a need for handling a feeding device of the type described which will simplify, reduce and/or eliminate the rather arduous task of assembling a nipple onto its respective nozzle portion.

SUMMARY OF THE INVENTION

Thus, it is a purpose of this invention to provide a new and improved method for handling feeding devices of the type described which will eliminate the disadvantages existing in the handling of such devices heretofore.

According to the present invention, a support means is provided, which means includes at least one but in practice any number of raised hollow threaded bosses. For example, such a raised boss can be a single unit fixed to a stationary surface. Alternatively, a plurality of such bosses can be formed integrally with or rigidly connected to a mounting plate.

To simplify the task of mounting the nipples onto the nozzles, a nozzle can be screwed onto a raised boss with the "upper" end of the end of the nozzle inverted and the "lower" end of the nozzle uppermost. With the boss (either a single boss or a plurality of bosses on a mounting plate) held fixed against lateral motion, it is a relatively simple task to force the nipple over the "lower end" of the nozzle.

Such a mounting plate would also be advantageous in cleaning the feeding devices. These feeding devices include gravity operated valves which normally close the passageway through the nozzle when the feeding device is in its normal position with the "upper" end of the nozzle uppermost and the nipple at the lower end thereof. However, when the feeding device is inverted, the passage through the nozzle will tend to remain open. Therefore, in accordance with a feature of the present invention, the nozzle is screwed onto a boss with the nipple thereon and the whole feeding device in the inverted position with the nipple uppermost. The feeding device is then dropped and permitted to fall vertically through a tank containing a solution of cleaning liquid. Merely because of the falling action of the feeding device, the cleaning liquid in the tank will pass upwardly through the hollow boss, through the open valve and the passageway in the nozzle portion and through the nipple and out the tip of the nipple. In this manner, it is possible to completely clean these feeding devices without necessarily removing the nipple from the nozzle for each cleaning.

Thus, it is an object of this invention to provide a new and improved method for handling feeding devices of the type described.

It is another object of this invention to provide a new and improved method for assembling nipples onto nozzles in feeding devices of the type described.

It is another object of this invention to provide a new and simplified method for cleaning feeding devices of the type described.

Other objects and advantages of the present invention will become apparent from the detailed description to follow along with the accompanying drawings.

BRIEF DESCRIPTION OF THE DRAWINGS

There follows a detailed description and accompanying drawings which describe and illustrate preferred embodiments of the invention.

DETAILED DESCRIPTION OF THE PREFERRED EMBODIMENTS

Figure 1:
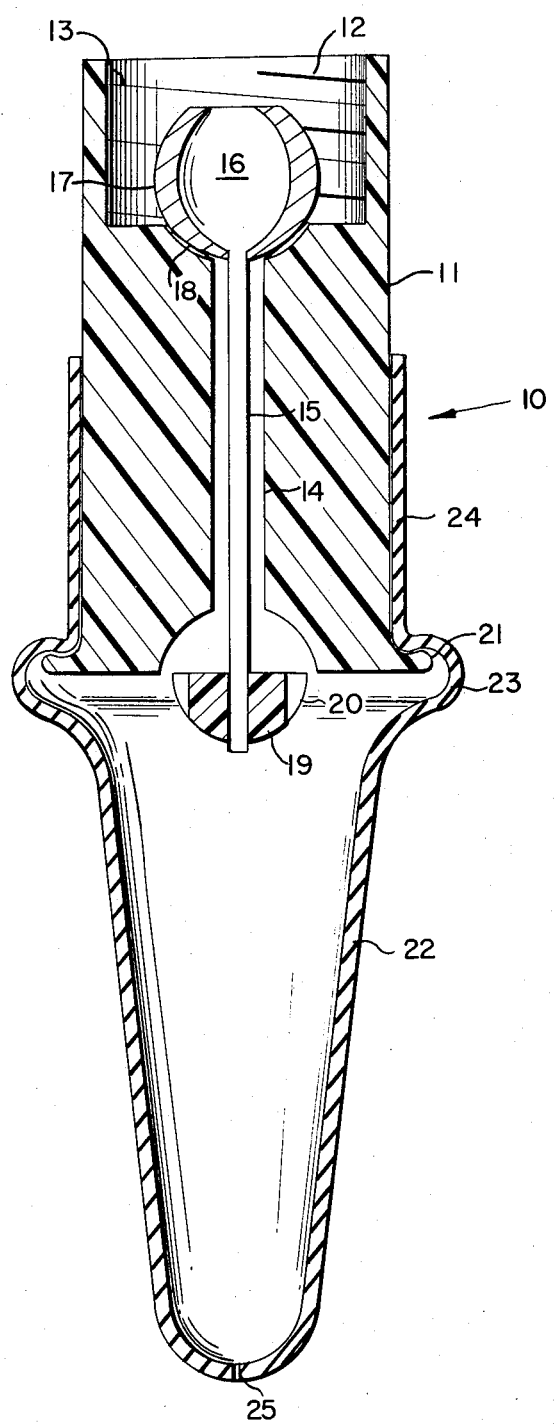
FIG. 1 is a cross-sectional view through a feeding device.

FIG. 1 illustrates a feeding device which is the subject of the present invention. This feeding device is similar to that described in the applicant's previous Pat. No. 2,722,-217, issued Nov. 1, 1955. Specifically, this feeding device 10 includes a cylindrical nozzle portion 11 having a cup-shaped inlet 12 which has formed therein helical threads 13. A passageway 14 extends completely through the nozzle portion 11. A rod 15 extends through this passageway and includes an enlarged head 16 at the uppermost end. An elastic cover 17 fits about the enlarged head 16 and normally rests under the force of gravity on a seat 18, thereby closing off the passage 14 and preventing the flow of liquid from the cup-shaped inlet 12 down into the passage 14. An enlarged head 19 is attached to the bottom of the nozzle 15. This head 19 includes a plurality of slots 20 formed therein. The purpose of these slots will be explained in greater detail below. These slots are visible also in FIG. 2.

The nozzle portion 11 includes an annular flange 21 about its lower periphery. A nipple 22 fits onto the lower end of the nozzle and is held there by means of the engagement between the annular bulged portion 23 of the nipple and the annular flange 21 of the nozzle portion. An aperture 25 is provided at the bottom of the nipple 22.

In operation, the calf will place the entire nipple 22 in his mouth and squeeze the same thereby causing the enlarged head 19 and hence also the rod 16 and the elements 16 and 17 upwardly, thereby opening the passageway between elements 17 and 18 to permit liquid feed to flow downwardly through passage 14 and through the opening 25.

It can be seen that in practice, operation of the nipple 22 depends upon its being squeezed enough so that it can push element 19 upwardly. At the same time, the young animal will pull downwardly on the nipple 22 with a strong force. Therefore, the nipple must also be sufficiently strong so that it cannot be pulled off of the nozzle 11. This is accomplished by the relatively stiff nature of the nipple 22 together with the structure of the nipple 22 in the vicinity of the annular flange 21. Thus, the material of nipple 22 is quite stiff and its is a relatively difficult task to fit the nipple 22 onto the annular flange 21.

Figure 2:
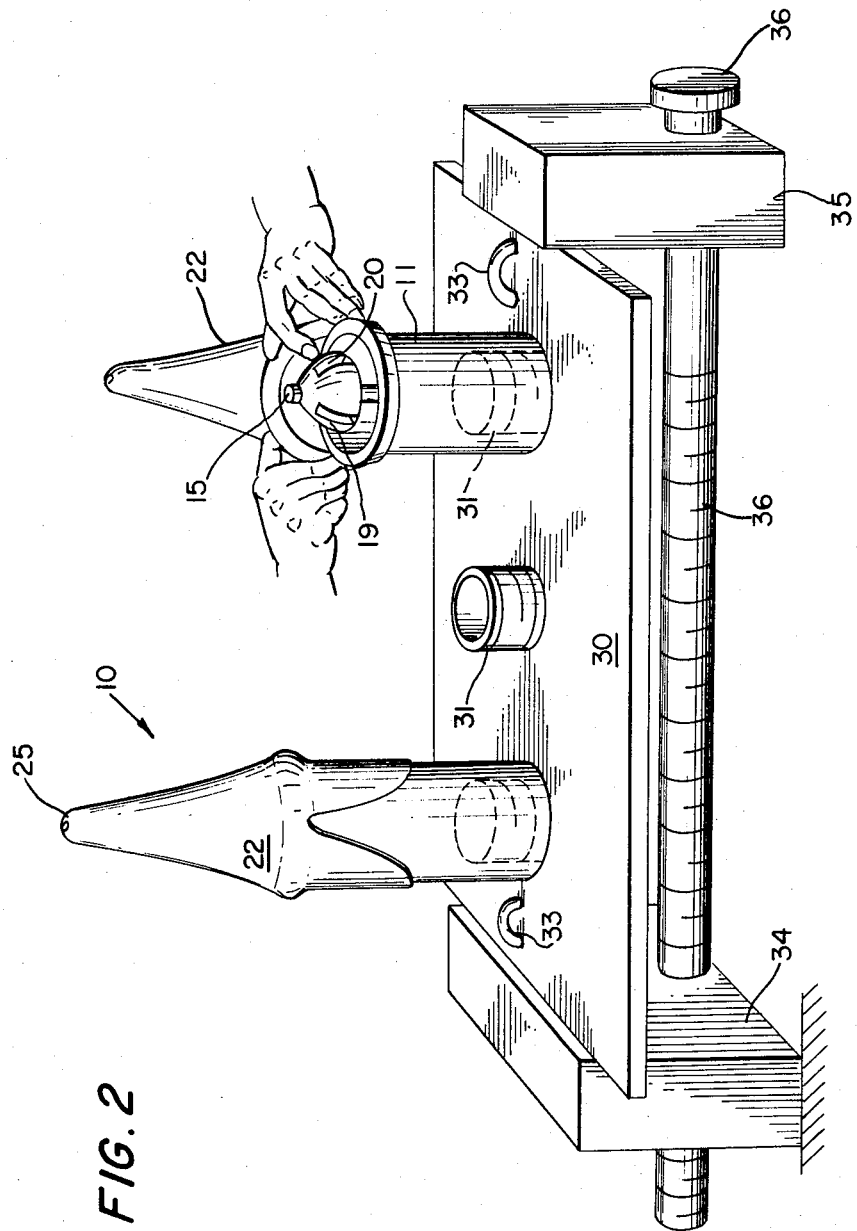
FIG. 2 illustrates an apparatus for handling the feeding device of FIG. 1 in accordance with a method of the present invention.

FIG. 2 illustrates a mounting plate 30 having a plurality of hollow threaded bosses extending upwardly therefrom. Although the mounting plate 30 can contain only a single boss 31 or a plurality of said bosses, in the illustrated example, the mounting plate 30 is shown as having three bosses 31 thereon. The lefthand boss 31 has a completed feeding device 10 thereon. The righthand boss has a nozzle 11 screwed thereon ready to receive the nipple 22. Movement of the nozzle 11 during the application of nipple 22 is prevented by simply holding the mounting plate 30 stationary. This may be done by any convenient manner. In FIG. 2 this is done by clamping the ends of the plate 30 in a vice between a fixed vice part 34 and a movable vice part 35, the latter part having the head of threaded rod 36 located therein such that the rod can turn freely but is prevented from undergoing axial movement relative to the part 35. The rod 36 then threadedly engages the part 34. Thus, by simply turning the rod 36, for example by grasping the enlarged head at the righthand end thereof, one can simply clamp the mounting plate 30 to hold it stationary and firmly in position.

Figure 3:
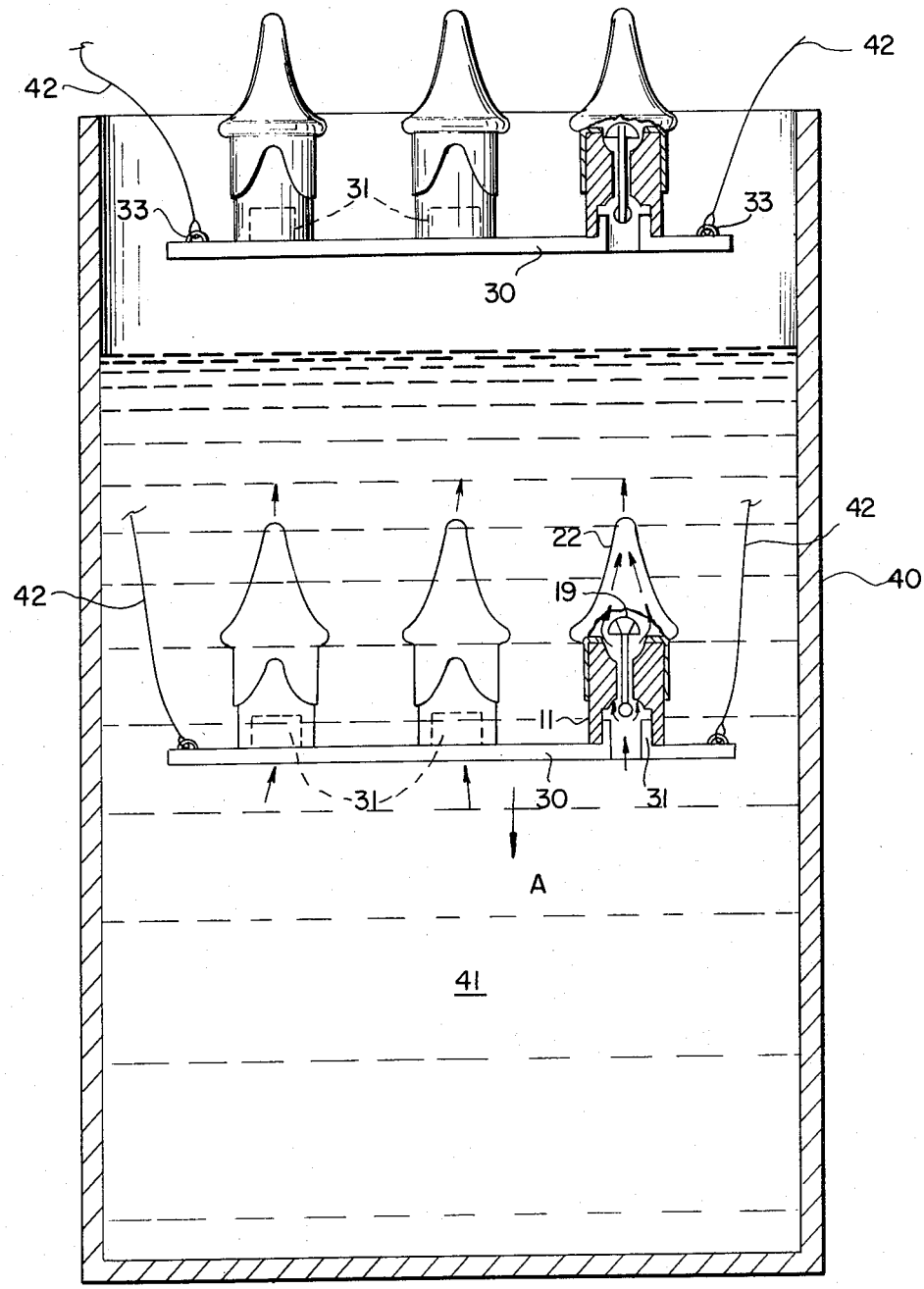
FIG. 3 illustrates another apparatus for handling the feeding device of FIG. 1 for carrying out the method of the present invention.

FIG. 3 illustrates another feature of the invention. In this case, the mounting plate 30 has three assembled feeding devices screwed onto the three raised threaded bosses 31. The left and middle feeding device is shown in side elevation while the righthand feeding device is shown in section.

FIG. 3 illustrates the said mounting plate 30 with the three feeding devices 10 thereon in two different positions relative to the cleaning solution 41 in a cleaning tank 40. In the uppermost position the fully loaded mounting plate 30 is being lowered but is still above the level of the liquid in the tank 40, the mounting plate being supported by string 42 which is tied to the eyelets 33 (these are shown in greater detail in FIG. 2). The lower mounting plate 30 shows this structure as it is moving downwardly through the liquid in cleaning tank 40 in the direction of the large arrow A. In this case the small arrows indicate the flow of cleaning fluid through the feeding device. Note in particular the lower righthand feeding device 10.

As is evident from FIG. 3, when the feeding device is inverted, the valve 17 separates from its seat 18 thereby permitting cleaning liquid to flow around the valve up the passageway and out the upper opening 25. However, during this downward movement of the mounting plate 30 with its feeding devices thereon, the enlarged head 19 will rest against the bottom of the cylindrical nozzle 11. To assure that this does not limit the upward flow of cleaning liquid, a plurality of slots 20 are provided in this enlarged head 19.

Thus, there is provided a vastly simplified procedure for efficiently and thoroughly cleaning the feeding devices 10 without undertaking the arduous task of removing the nipples 22 from the nozzles 11.

Although the invention has been described in considerable detail with respect to preferred embodiments thereof, it is to be understood that the invention is capable of numerous modifications and variations apparent to those skilled in the art without departing from the spirit and scope of the invention as defined in the claims.

I claim:

1. A method of cleaning a suckling liquid feeding device having an elongated nozzle open at an upper end to receive a liquid feed, a nipple attached to the lower end of the nozzle and having an opening therethrough, a passageway through the nozzle for delivering liquid feed from the upper end to the lower end, and a gravity operated valve normally closing the passageway when the feed device is in its normal position with the upper end uppermost, said method comprising the steps of, attaching the feed device to a mounting means such that the said upper end of the nozzle remains open, arranging the feed device with the nipple uppermost such that the gravity operated valve falls off of its seat to permit liquid to flow freely through the passage, passing the device downwardly through a cleaning solution, whereby the cleaning liquid enters the open end of the nozzle and passes through the passageway and out the nipple opening.

2. The method of claim 1, wherein the open end of the nozzle is threaded and the step of arranging includes screwing the open end onto a threaded boss on a mounting means.

3. The method of claim 2, wherein the step of passing the device downwardly comprises dropping the mounting means with the feed device attached thereto such that it falls by gravity.

References Cited

UNITED STATES PATENTS

| | | | |
|---|---|---|---|
| 2,475,407 | 7/1949 | Sell | 134—22 R |
| 2,506,205 | 5/1950 | Fry | 134—166 R X |
| 2,722,217 | 11/1955 | Rose-Miller | 119—71 X |

MORRIS O. WOLK, Primary Examiner

J. T. ZATARGA, Assistant Examiner

U.S. Cl. X.R.

119—71, 72.5; 134—25 A, 32